March 30, 1965 P. S. LUND 3,176,206
TORQUE BALANCING MOTOR CONTROL
Filed June 12, 1961 2 Sheets-Sheet 2

INVENTOR.
PHILIP S. LUND
BY Roger W. Jensen
ATTORNEY

United States Patent Office 3,176,206
Patented Mar. 30, 1965

3,176,206
TORQUE BALANCING MOTOR CONTROL
Philip S. Lund, Grand Rapids, Mich., assignor to
Honeywell Inc., a corporation of Delaware
Filed June 12, 1961, Ser. No. 116,534
15 Claims. (Cl. 318—32)

This invention relates to improvements in signal generators and torque generators integrated on the same core and more particularly to means for reducing the magnetic interaction between signal generators and torque generators integrated on the same core.

Devices such as gyroscopes, accelerometers, or similar devices which have a member that rotates or moves in relation to a reference due to some force which is to be measured or which is otherwise applied generally utilize some device such as a signal generator to detect or measure this rotation or movement and produce a voltage representative of it. Generally, the signal generator consists of a stationary member with a primary and secondary winding on it and a rotor or armature connected to the rotatable or movable member of the gyroscope or other device. A movement of the rotor then changes the flux linkage between the primary winding and the secondary winding on the stator of the signal generator. A device known as a torque or force generator is generally utilized in devices such as gyroscopes and accelerometers to maintain the movable member near its null position. In many cases the torque generator is a device similar to the signal generator except that an alternating voltage is applied to both the primary winding and the secondary winding on the stator to produce a torque on the rotor which is connected to the movable member of the gyroscope or other device.

It can be seen that much space and manufacturing costs would be saved if a single stator and rotor were used for both the signal generator and the torque generator. However, in prior art devices which attempted to integrate the signal generator and the torque generator on the same stator much trouble arose because of interaction between the flux produced by the torque generator and that produced by the signal generator. Also, it was very difficult to manufacture the device so that the signal generator was at a null at the same mechanical position that the torque generator was at a null.

In most cases the output of the signal generator is fed to an amplifier and the amplified signal is then fed to the control winding or input of the torque generator. In this manner when the signal generator is off null, or the rotor has rotated some degree, the signal generator generates a signal which is amplified and sent to the torquer. The torquer then produces a torque on the rotor which tends to turn it back to the null position. In this manner the device which the rotor is connected to is kept near its null position. However, due to the interaction between the signal generator flux and the torque generator flux if the gain of the amplifier, amplifying the signal of the signal generator, is too high the entire device will tend to oscillate. Because of the improvements incorporated in the present device the gain of this amplifier may be increased by at least a factor of twenty without adverse oscillation.

In the present invention the stator is a cylindrical device having a plurality of poles radiating inward toward a central axis, and forming a central aperture therebetween. The rotor is a cylindrical device having half the number of poles that the stator has, radiating outward from a central axis, and rotatably mounted within the central aperture formed by the stator. The poles of the stator are divided into four equal quadrants. The primary and secondary windings of the signal generator are wound around the poles of two diametrically opposite quadrants. The primary and secondary of the torque generator are wound around the poles in the other two quadrants. In addition to these four windings there is a balance winding and a compensation winding both of which are wound around the same poles as the torque generator windings. The purpose of the compensation winding is to provide a means for compensating for unwanted torques on the rotor, or in other words, torques which are not produced by the torque generator. The purpose of the balance winding is to compensate for magnetic interactions between the signal generator and the torque generator. By adding a variable transformer to the circuitry to compensate for the physical difference between the signal generator nulls and the torque generator nulls a highly accurate and extremely sensitive device has been provided.

Accordingly, it is an object of this invention to provide an improved control apparatus.

Another object of this invention is to provide a control apparatus with an increased sensitivity and gain.

Another object of this invention is to provide a means of electrically and magnetically separating the signal generator and the torque generator of this control apparatus, while maintaining them on the same stator.

Another object of this invention is to provide a means for adjusting the null of the signal generator to coincide with the null of the torque generator.

These and other objects of the present invention will be understood upon consideration of the accompanying specification, claims, and drawings of which:

FIGURE 3 is a schematic diagram of the signal generator-torque generator.

Figure 1:
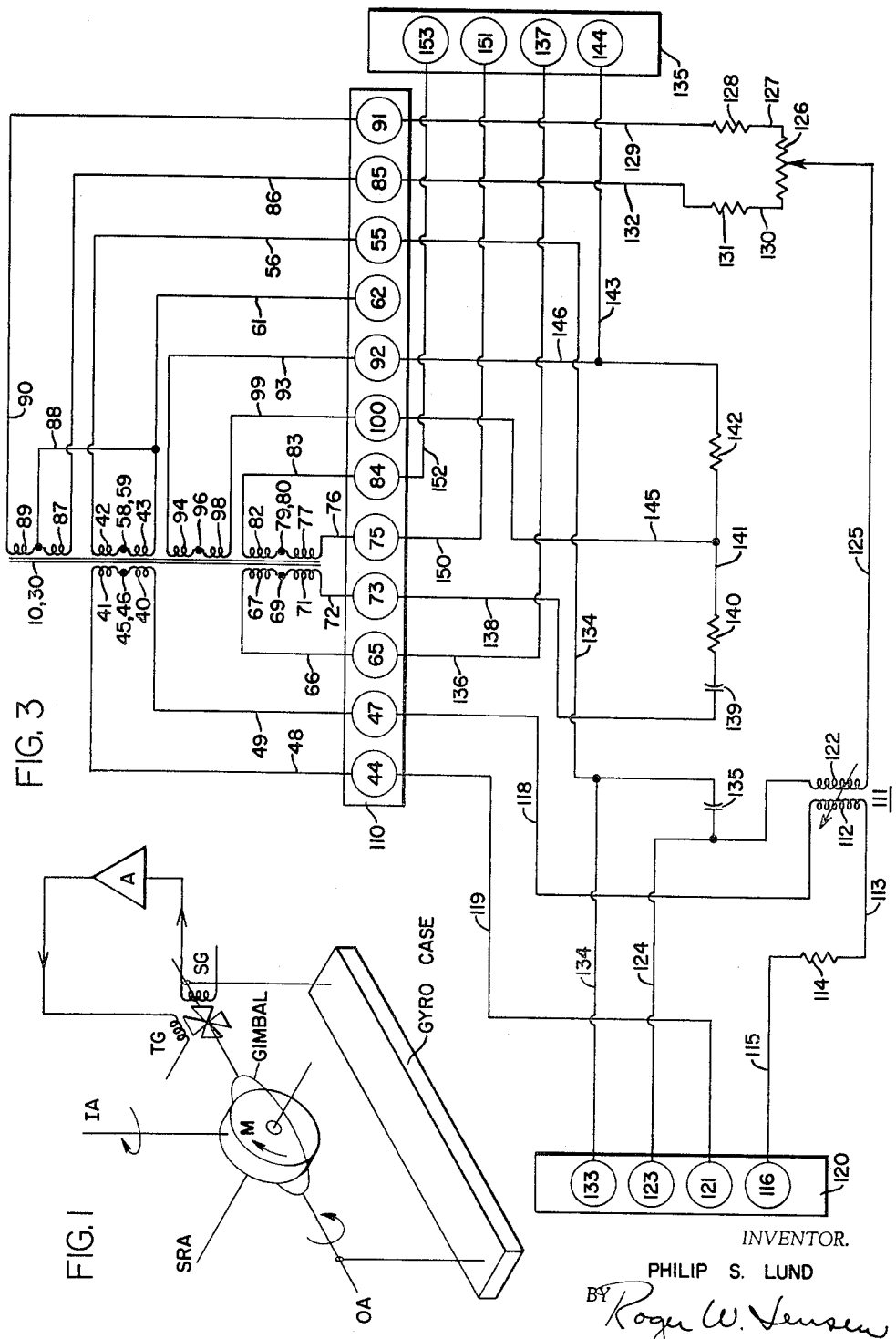
FIGURE 1 is a somewhat schematic diagram of a gyroscope showing the position of the torque generator and signal generator.

Referring to FIGURE 1 a gyroscope is shown in a somewhat schematic representation and a typical use of the present control apparatus is shown. The gyro has a spin motor designated M which spins within a gimbal about the spin reference axis designated SRA. The gyroscope also has an input axis designated IA perpendicular to the spin reference axis SRA and an output axis designated OA mutually perpendicular to the spin reference axis SRA and the input axis IA. A schematic means for mounting the gimbal on the gyro case is shown and the present control apparatus is shown schematically mounted on the output axis. The rotor of the control apparatus is mounted on the output axis so that any movement of the gimbal about the output axis causes the rotor to move within the winding of the control apparatus. A signal generator is shown schematically as one winding designated SG. A torque generator is shown schematically as a single winding utilizing the same rotor as the SG, this winding being designated TG. In FIGURE 1, the output of the signal generator SG is fed through an amplifier A to the input of the torque generator TG. This is the normal manner of connecting a gyroscope to maintain the rotor in the correct position. If the gyroscope is caused to be rotated about the input axis, the spin motor will precess about the output axis causing the rotor of the control apparatus to move within the winding of the signal generator SG. This causes the signal generator to produce a signal which is amplified in amplifier A and fed to the torque generator TG. The torque generator then produces a torque on the rotor of the opposite sense from the precessional torque. A state of equilibrium is reached where the torque from the TG is equal and opposite to the gyroscopic precessional torque. As is well known, the current applied to the TG may be used as a measure of the rate of movement of the gyro about the IA.

If it is desired to maintain the spin motor of the gyroscope in a closer proximity to its original position about the output axis, the gain of the feedback loop must be increased. That is, the gain of the amplifier must be increased so that smaller signals from the signal generator SG will have more effect on the torque generator TG. However, as the gain of the amplifier is increased small undesirable signals such as magnetic coupling between the torque generator TG and the signal generator SG are amplified more and the entire feedback loop (as well as the control system controlled by the gyroscope) has a tendency to oscillate.

Figure 2:
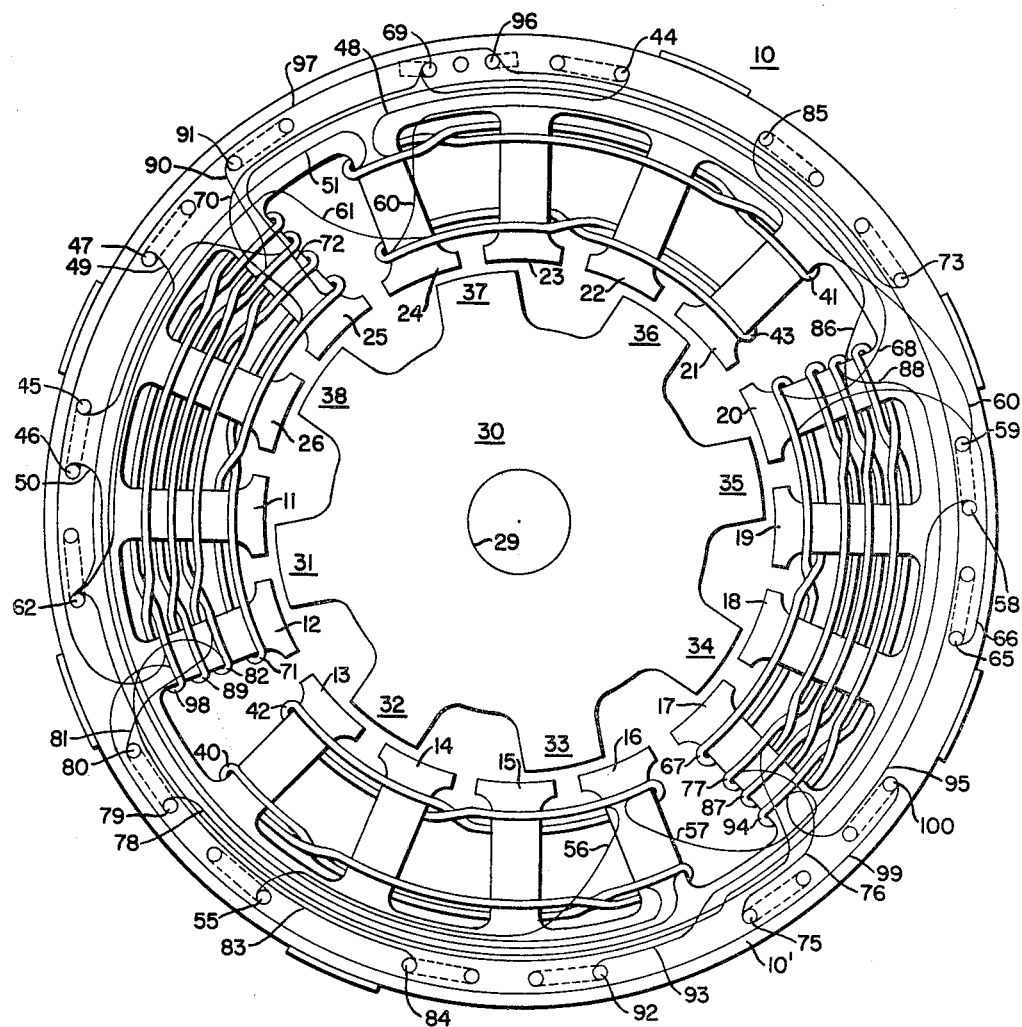
FIGURE 2 is a winding diagram of the stator of the torque generator- signal generator.

Referring to FIGURE 2, an end view of the signal generator-torque generator has been shown in which one turn of each winding is shown for simplicity. It should be remembered that this single turn for each winding simply shows the manner in which the winding will be wound and in actuality each winding has many turns. The stator designated 10 is comprised of an outer cylindrical member 10' having sixteen uniformly spaced salient poles numbered consecutively 11 through 26. The sixteen poles 11 through 26 are connected to or are an integral part of the inner surface of cylindrical member 10' and radiate inwards toward a central axis. The ends of the uniformly spaced salient poles 11 through 26 form a central aperture in which is mounted rotor 30.

Rotor 30 is concentrically mounted within the aperture formed by poles 11 through 26 by means of a centrally located hole 29. The central hole 29 in rotor 30 is simply for mounting rotor 30 to some device such as the gyroscope as shown in FIGURE 1. It should be understood that any convenient means for mounting rotor 30 for rotation can be used and that central hole 29 is simply one convenient method. Rotor 30 has eight poles numbered consecutively 31 through 38 and uniformly radiating outwardly from the central axis. Poles 31 through 38 of rotor 30 radiate outwards towards poles 11 through 26 of stator 10 and are of such a length as to form a uniform air gap therebetween. In this preferred embodiment, each of the poles 31 through 38 on rotor 30 are approximately as wide as each of the poles 11 through 26 on stator 10.

The signal generator consists of two windings namely a primary winding and a secondary winding. The primary winding is comprised of two coils 40 and 41 and the secondary winding is comprised of two coils 42 and 43. In FIGURE 2 one turn of each coil will be discussed and one turn of each coil is shown. However, it should be remembered that each coil has many turns and one turn is used simply for convenience. Also, all of the rest of the turns of each winding will be wound exactly as the one turn shown is wound. In fact, each of the turns shown can be thought of as a complete winding made up of a number of turns of wire approximately the size of the lead wires shown in FIGURE 2. If the stator is divided into imaginary quadrants so that poles 13 through 16 are contained within a first quadrant, poles 17 through 20 are contained within a second quadrant, poles 21 through 24 are contained within a third quadrant and poles 25 through 12 are contained within a fourth quadrant, then the signal generator windings will be wound on poles within the first and third quadrants. It should be noted that the signal generator could be wound on any diametrically opposite set of poles equally well. Each winding, as shown in FIGURE 2, consists of two small wires attached to the larger winding. The larger winding can be thought of as containing a number of turns of the smaller wires. The windings are actually wound in the direction in which the small wire approaches the larger winding.

Coil 40 of the primary winding of the signal generator is wound in a manner such that it forms three loops. The first loop encompasses pole 13 of stator 10, the second loop encompasses poles 14 and 15 of stator 10, and is wound in the opposite direction of the first loop, and the third loop encompasses pole 16 of stator 10 and is wound in the same direction as the first loop. Coil 41 is wound in a manner similar to coil 40. The first loop of coil 41 encompasses pole 21 of stator 10, the second loop encompasses poles 22 and 23 of stator 10 and is wound in a direction opposite to the direction of the first loop, and the third loop encompasses pole 24 of stator 10 and is wound in the same direction as the first loop. One side of coil 40 is connected to a terminal 46 by means of a lead 50 and terminals 46 and 45 are connected together by some convenient means such as a solder lug. The other side of coil 40 is connected to a terminal designated number 47 by a lead 49. One side of coil 41 is connected to a terminal 44 by means of a lead 48 and the other side of coil 41 is connected to terminal 45 by means of a lead 51.

In all of these windings it should be remembered that the coils are actually comprised of a number of turns of wire, which the connecting leads are actually a continuation of, and the coils are wound in the direction in which the lead wire enters the coil. For example, lead 49 enters coil 40 in a clockwise direction and coil 40 would be wound in that manner, starting where lead 49 enters coil 40 proceed under poles 15 and 14, over pole 13 and around it, under pole 13, over pole 14 and pole 15, under pole 16 and around it. After a plurality of turns in this manner the wire leaves coil 40 in a direction designated by lead 50.

The secondary winding of the signal generator consists of coils 42 and 43. Coil 42 is connected to a terminal 55 by means of a lead 56. Coil 42 forms a first loop about poles 13 and 14 and a second loop about poles 15 and 16. The second loop of coil 42 is wound in the opposite direction of the first loop of coil 42. A lead 57 connects the other side of coil 42 to a terminal 58. Terminal 58 is connected to another terminal 59 by some convenient means such as a lug or a small portion of wire. Terminal 59 connects to one side of coil 43 by means of a lead designated 60. Coil 43 is similar to coil 42 in that it forms a first and second loop. The first loop is about poles 21 and 22 and the second loop is wound in the opposite direction about poles 23 and 24. The other side of coil 43 connects by means of a lead 61 to the terminal 62.

The torque generator has a pattern winding consisting of coil 67 and coil 71 and a control winding consisting of coil 77 and coil 82. Coil 67 of the pattern winding of the torque generator connects to a terminal designated 65 by means of a lead 66. Coil 67 forms two loops one of which encompasses poles 17 and 18, and the other of which encompasses poles 19 and 20 and is wound in the opposite direction of the first loop. The other side of coil 67 connects to a terminal designated 69 by means of a lead 68. Terminal 69 is also connected to coil 71 by means of a lead 70. Coil 71 is similar to coil 67 in that it forms two loops, one of which encompasses poles 25 and 26 and the other of which encompasses poles 11 and 12 and is wound in the opposite manner of the first loop. The other side of coil 71 connects to a terminal designated 73 by means of a lead 72. Coil 77 of the control winding of the torque generator is connected to a terminal designated as 75 by means of a lead 76. Coil 77 forms three loops namely a first loop encompassing pole 17, a second loop encompassing poles 18 and 19 and wound in the opposite direction as the first loop, and a third loop encompassing pole 20 and wound in the same direction as the first loop. The other side of coil 77 is connected to a terminal designated 79 by means of a lead 78. Terminal 79 connects to a terminal 80 by some convenient means such as a lug. Terminal 80 is connected to coil 82 by means of a lead 81. Coil 82 is similar to coil 77 in that it forms three loops, a first loop encompassing pole 25, a second loop encompassing poles 26 and 11 and wound in the opposite direction from the first loop, and a third loop encompassing pole 12 wound in the same direction as the first loop. The other side of coil 82 is connected to a terminal designated 84 by means of a lead 83. These windings are also schematically shown in FIGURE 3.

Also encompassing the poles contained within the second and fourth quadrants of the stator 10 are a compensation winding consisting of coils 94 and 98 and a balance winding consisting of coils 87 and 89. Coil 87 of the balance winding forms three loops the first of which encompasses pole 17, the second of which encompasses poles 18 and 19 and is wound in an opposite direction from the first loop, and the third loop which encompasses pole 20 and is wound in the same direction as the first loop. One side of coil 87 is connected to a terminal designated 85 by a lead 86 and the other side of coil 87 is connected to terminal 62 by a lead 88. The other coil 89 of the balance winding is wound similar to coil 87 in that it forms three loops. The first loop encompasses pole 12, the second loop encompasses poles 11 and 26 and is wound in the opposite direction from the first loop, and the third loop encompasses pole 25 and is wound in the same direction as the first loop. One side of coil 89 connects to terminal 62 by means of lead 88 and the other side of coil 89 connects to a terminal designated 91 by means of a lead 90.

Coil 94 of the compensation winding is wound in a manner to form three loops. The first loop encompasses pole 17, the second loop encompasses poles 18 and 19 and is wound in the opposite direction of the first loop, and the third loop encompasses pole 20 and is wound in the same direction as the first loop. One side of coil 94 connects to a terminal desigated 92 by means of a lead 93. The other side of coil 94 is connected by means of a lead 95 to a terminal 96. Terminal 96 is also connected by means of a lead 97 to the other coil 98 of the compensation winding. Coil 98 is wound similar to coil 94 in that it forms three loops. The first loop encompasses pole 12, the second loop encompasses poles 11 and 26 and is wound in the opposite direction of the first loop and the third loop encompasses pole 25 and is wound in the same direction as the first loop. The other side of coil 98 connects to a terminal 100 by means of a lead 99. All of the windings shown in FIGURE 2 can be seen schematically in FIGURE 3 and are numbered correspondingly.

In FIGURE 3 all of the windings previously described are shown schematically as comprising a single transformer. It should be understood that the core of this schematic transformer would be comprised of stator 10 and rotor 30. A terminal board designated as 110 shown schematically in FIGURE 3 as a separate terminal board would actually be the outer case or stator of the control apparatus as shown in FIGURE 2.

A variable transformer designated as 111 in FIGURE 3 consists of a primary winding 112 and a secondary winding 122. One side of primary winding 112 connects to a resistor 114 by means of a lead 113. The other side of resistor 114 connects to a terminal 116, on a terminal board designated 120, by means of a lead 115. The other side of primary winding 112 of variable transformer 111 connects to a terminal 47 on terminal board 110 through a lead 118. The signal generator primary winding circuit is then completed by connecting terminal 44 on terminal board 110 to a terminal 121 on terminal board 120 by means of a lead 119. Terminals 116 and 121 are adapted to have an alternating voltage applied thereto. The secondary winding 122 of variable transformer 111 connects to a terminal 123 on terminal board 120 by means of a lead 124. The other side of the secondary winding 122 of variable transformer 111 connects to the center tap of a variable resistor 126 by means of a lead 125. One side of the resistive element of variable resistor 126 connects to one side of a resistor 128 through a lead 127. The other side of resistor 128 connects to terminal 91 on terminal board 110 through a lead 129. The other side of the resistive element of variable resistor 126 connects to a resistor 131 through a lead 130. The other side of resistor 131 connects to terminal 85 on terminal board 110 through a lead 132. Terminal 133 on terminal board 120 connects to terminal 55 on terminal board 110 by means of a lead 134. One side of a capacitor 135 is connected to lead 124 and the other side of capacitor 135 is connected to lead 134. The secondary circuit of the signal generator is completed by attaching a load, not shown, across terminals 133 and 123 on terminal board 120. In normal usage this load would consist of an amplifier, because on the average the signal from the signal generator is too small for normal usage without amplification.

Terminal 65 of terminal board 110 connects to a terminal 137 on a terminal board 135 by means of a lead 136. Terminal 73 on terminal board 110 connects to one side of a capacitor 139 by means of a lead 138. Capacitor 139 is in series with a resistor 140 the other side of which connects to another resistor 142 by means of a lead 141. The other side of resistor 142 connects to a terminal 144 on terminal board 135 by means of a lead 143. Terminals 137 and 144 on terminal board 145 are adapted to have an alternating voltage applied thereto. In this manner, by means of the aforementioned circuitry, the torque generator pattern field winding may be energized.

The compensation winding, coils 98 and 94, is connected in series with the torque generator pattern field winding by connecting it in parallel with resistor 142. This is accomplished by connecting terminal 100 of terminal board 110 to one side of resistor 142 by means of a lead 145, and by connecting terminal 92 of terminal board 110 to the other side of resistor 142 by means of a lead 146.

Terminal 75 on terminal board 110 is connected to a terminal 151 on terminal board 135 by means of a lead 150. Terminal 84 on terminal board 110 is connected to a terminal 153 on terminal board 135 by means of a lead 152. Terminals 151 and 153 are adapted to have an alternating voltage applied thereto. The alternating voltage to be applied to terminals 151 and 153 normally comes from an amplifier, not shown, connected across terminals 123 and 133 on terminal board 120. The amplifier feedback circuit just described is shown somewhat schematically in FIGURE 1.

*Operation*

The rotor 30 as shown in FIGURE 2 is in the null position for both the signal generator and the torque generator. Assume that an alternating voltage is applied to terminals 116 and 121 on terminal board 120. Also, assume for the moment that terminal 121 is positive and, neglecting the effects of resistor 114 and variable transformer 111 for the moment, terminal 44 on terminal board 110 will be positive while terminal 47 on terminal board 110 will be negative. Thus, current will flow from terminal 44 through lead 48, through coil 41, lead 51, to terminal 45, from terminal 45 through the lug to terminal 46, through lead 50 to winding 40, from the other side of winding 40 through lead 49 to terminal 47. This will, momentraliy, cause pole 21 to look like a south pole, pole 22 to look like a north pole, pole 23 to look like a north pole, and pole 24 to look like a south pole. Since pole 36 of rotor 30 is exactly between pole 21 and pole 22 of stator 10 the flux which flows out of pole 22 will flow into 36 of rotor 30 and back into pole 21 of stator 10. Thus, it can be seen that the net voltage induced in the portion of coil 43 which is wound around poles 21 and 22 will be zero. The flux flowing out of pole 23, which is momentarily a north pole, will flow into pole 37 of rotor 30 and back into pole 24, which is momentarily a south pole. Thus, the effect on this loop of coil 43 is also zero. It can be seen that the net effect of the flux flowing out of pole 13 of the stator into pole 32 of the rotor 30 and back into pole 14 of the stator 10 will be zero, and the flux flowing out of pole 16 of stator 10 into pole 33 of rotor 30 and back into pole 15 of stator 10 will also be zero. Thus, the net voltage induced into the coils 42 and 43 of the secondary winding of the signal generator is zero and the signal generator is at a null. When the alternating voltage on terminals 116 and 121 of terminal board 120 changes so that terminal 121 is negative all of the poles of the signal generator will be exactly opposite magnetically to the foregoing explanation so that the signal generator will still be at a null when the rotor is at the position in which it is shown in FIGURE 2.

However, if the device to which the rotor 30 is attached should turn and thereby cause the rotor to turn so that pole 32 of rotor 30 is aligned radially with pole 14 of stator 10, pole 33 of rotor 30 is aligned with pole 16 of stator 10, pole 36 is aligned with pole 22 of stator 10, and pole 37 of rotor 30 is aligned with pole 24 of stator 10, the signal generator would no longer be at a null position. Assuming terminal 121 of terminal board 120, and hence terminal 44 of terminal board 110, is still positive, but becoming less positive, the current will flow through the signal generator primary winding as already described. That is, from terminal 44 through coil 41 and through coil 40 to terminal 47 on terminal board 110. This will cause pole 16 of stator 10 to act as a north pole while pole 14 of stator 10 acts as a south pole. Thus, flux will flow from pole 16 of stator 10 to pole 33 of rotor 30, through rotor 30 to pole 32, and into pole 14 of stator 10 to complete the flux path. Since poles 13 and 15 are not radially aligned with a pole of the rotor, no flux will flow from these poles. It can be seen that a net voltage will be induced in coil 42 which will tend to make current flow in the circuit from terminal 58 to terminal 55. Simultaneously the current in the primary winding makes pole 22 of stator 10 a north pole and pole 24 of stator 10 a south pole. Thus, flux will flow from pole 22 of stator 10 into pole 36 of rotor 30, through rotor 30 to pole 37, and back into the stator by way of pole 24 to complete the flux path. Thus a net voltage will be induced into coil 43 which will tend to make current in the circuit flow from terminal 62 to terminal 59. Therefore a net output voltage will be produced. A net output voltage would also be produced if terminal 47 on terminal board 110 is positive but becoming less positive. This is true because all the poles of the signal generator would be reversed magnetically to the explanation above. That is, the north poles would then be south poles and the south poles would then be north poles.

As has already been explained, terminals 137 and 144 on terminal board 135 are adapted to have an alternating voltage applied at all times that the control apparatus is energized. Neglecting for the moment the effects of the compensation winding which is in series with the torque generator pattern field winding and wound on the same poles, terminals 65 and 73 on terminal board 110 can be assumed to have an alternating voltage applied directly thereto. Also, assume that terminals 153 and 151 on terminal board 135 do not have a control voltage applied thereto. That is, the torque generator control field windings 77 and 82 are not energized. When terminal 73 on terminal board 110 becomes positive the current will flow through coil 71 and coil 67 in such a manner as to make poles 17, 18, 25 and 26 south poles and poles 19, 20, 11 and 12 north poles. Thus, it can be seen that flux will flow from poles 11 and 12 on stator 10 into pole 31 on rotor 30, through rotor 30, and out of pole 38 into poles 25 and 26 on stator 10 to complete the magnetic circuit. Also, flux will flow out of poles 19 and 20 on stator 10 into pole 35 on rotor 30, through rotor 30 to pole 34, and thence into poles 17 and 18 on stator 10 to complete the magnetic circuit. While the rotor is in this position and the torque generator control field windings 77 and 82 are deenergized it can be seen that no torque is produced on rotor 30. Therefore, the rotor 30 is in a null position for the torque generator. The rotor would also be at a null if terminal 65 on terminal board 110 were positive. This is true because all of the poles of the torque generator would be exactly opposite, magnetically, to the explanation above. That is, the north poles would then be south poles and the south poles would then be north poles.

It should be noted that any pole on the rotor 30 can be aligned between any two poles on the stator and the rotor will be in a null position. However, this does not necessarily mean that the device attached to the rotor is in its proper position. Thus, some means of torquing or turning the rotor so that the device attached to it is in its proper position must be added. This is done by applying a control voltage to terminals 151 and 153 on terminal board 135.

Assume that the torque generator pattern field windings are energized as previously described. That is, terminal 73 on terminal board 110 has a positive voltage applied thereto. Also, assume terminals 153 and 151 have an alternating voltage applied thereto and, momentarily, terminal 75 on terminal board 110 is positive. The current flowing through the torque generator control field winding, coils 77 and 82, will cause poles 17, 20, 25 and 12 to look like south poles, and poles 18, 19, 26 and 11 to look like north poles. As previously explained, the current flowing through the torque generator pattern field winding, coils 67 and 71, will make poles 17, 18, 25 and 26 look like south poles and poles 19, 20, 11 and 12 look like north poles. Thus, the flux caused by the torque generator pattern field windings 67 and 71 and the flux caused by the torque generator control field windings 77 and 82 will cancel each other out in poles 18, 20, 26 and 12. The flux in poles 17 and 25 will add to make these appear as south poles and the flux in poles 19 and 11 will add to make them appear as north poles. Therefore, because of the magnetic flux on one side of the device flowing from pole 19, through pole 35 on rotor 30, out of pole 34 on rotor 30, and into pole 17 on the stator 10; and the magnetic flux on the other side of the device flowing out of pole 11 on stator 10 into pole 31 on rotor 30, and out of pole 38 on rotor 30 into pole 25 on stator 10, a clockwise torque will be applied to rotor 30. This torque will tend to radially align pole 17 on stator 10 and pole 34 on rotor 30, pole 19 on stator 10 and pole 35 on rotor 30, pole 25 on stator 10 and pole 38 on rotor 30 and pole 11 on stator 10 and pole 31 on rotor 30. Thus, it can be seen that a torque can be applied to rotor 30 by applying a control voltage to terminals 151 and 153 on terminal board 135 or, in other words, the torque generator control field winding.

In some of the prior art devices both of the windings of the torque generator and both of the windings of the signal generator were disposed about all of the poles of the stator. That is, each winding was wound entirely around the stator. This method of winding caused a large quantity of interaction between the torque generator flux and the signal generator flux, and any attempt to make a tight loop by applying the signal generator output to a high gain amplifier and the output of the high gain amplifier to the torque generator control pattern field resulted in oscillations. These oscillations could take the form of the rotor itself oscillating or, in some cases, simply electrical oscillations in the circuitry. However, by restricting the torquer to two diametrically opposite quadrants of the stator and the signal generator to two diametrically opposite quadrants of the stator some of this interaction is eliminated.

In the present invention the balance winding, coils 87 and 89, has been added to eliminate the rest of the interaction between the signal generator and the torque generator. This is accomplished by winding the balance winding about the torque generator poles as already described. Thus, a voltage is induced in the balance winding which tends to vary in the same manner as the error signal which is induced in the signal generator secondary winding by the torque generator winding. The voltage induced in the balance winding varies in the same manner as the error signal but they are not necessarily of the same magnitude. Thus, the circuitry shown in FIGURE 3 is utilized. That is, one side of the signal generator secondary winding coil 43 connects by means of lead 88 to what is effectively the center tap of the balance winding. In this manner a reference is established, and the variable arm of variable resistor 126, which is effectively in parallel with the windings of the balance winding will simply have the signal generator secondary winding voltage on it when it is in the center of its movable range. However, by moving the arm of resistor 126 towards resistor 128 the voltage induced in the balance winding will be added to the voltage induced in the signal generator secondary winding, and by moving the arm toward resistor 131 the voltage induced in the balance winding will be subtracted from the signal generator secondary winding voltage. Thus, any fluctuations induced in the signal generator secondary winding due to the torque generator can be completely eliminated by setting the arm of potentiometer 126 to a given position. This device has eliminated the coupling between the signal generator and the torque generator so effectively that the gain of an amplifier connecting the signal generator secondary winding output to the torque generator control field winding input may be improved by approximately a factor of twenty.

The function of the compensation winding is to compensate for non-acceleration produced torques acting on the rotor. These torques could be produced by the device which is attached to the rotor, which in this example would be the gimbal of a gyro, or they could be due to the rotor and stator of the device described not being perfectly symmetrical, or they might be due to some mechanical or electrical discrepancies, such as winding dissimilarities. By referring to FIGURE 3 it can be seen that the coils 94 and 98 of the compensation winding are effectively in series with the torque generator pattern field winding. It can also be seen that resistor 142 is effectively in parallel with the compensation winding. By varying the size of resistor 142 the amount of current flowing through the compensation winding can be varied, and the torque compensation will be effected in the following manner. Referring to FIGURE 2 it can be seen that the coils 94 and 98 of the compensation winding are wound in the same manner as the torque generator control field winding. In fact, the compensation winding causes a torque on rotor 30 in the same manner as the torque generator control field winding. It should be noted, however, that the compensation winding is much smaller than the torque generator control field winding. The amount of torque which the compensation winding produces on rotor 30 is proportional to the amount of current flowing through the coils 94 and 98 of the compensation winding, and the direction of the torque on rotor 30 will depend upon the sense in which coils 94 and 98 are connected in the circuit. Thus, any non-acceleration produced torques acting on the rotor are effectively cancelled.

Because of the nonsymmetry in the mechanical and electrical structure of devices such as the one described a common source of trouble is the non-coincidence of the signal generator and the torque generator nulls. This problem can be seen more clearly by assuming the signal generator is at a null and the torque generator is slightly off null. At this time a voltage will be induced in the torque generator control field winding by the torque generator pattern field winding, and this voltage will be fed back to the source of control signal voltage. Conversely, when the torque generator is at a null and the signal generator is slightly off null the signal generator winding will be producing a signal. Referring to FIGURE 3, the primary winding 112 of variable transformer 111 is connected in series with coils 40 and 41 of the signal generator primary winding. The secondary winding 122 of variable transformer 111 is connected in series with the coils 42 and 43 of the signal generator secondary winding and the balance circuit, coils 87 and 89, previously described. The variable transformer 111 is adjusted so that when the torque generator is at a null the secondary 122 of variable transformer 111 has induced in it the same amount of voltage as is induced in coils 42 and 43 of the signal generator secondary winding by the primary winding, coils 41 and 40. Thus, by connecting the secondary 122 of variable transformer 111 in series with coils 42 and 43 of the signal generator secondary but in the opposite sense the two equal voltages cancel and the signal generator is at a null, or the net output voltage is zero, in the same mechanical position as the torque generator.

Since the non-coincidence of the nulls of the signal generator and the torque generator is a constant, once the adjustment of variable transformer 111 is accomplished it will compensate for the non-coincidence of the nulls throughout the entire range of rotor 30's movements. Also, any variations in the alternating voltage applied to terminals 116 and 121 of terminal board 120, or, effectively, the signal generator primary winding will be compensated for. Thus, it can be seen that a novel and effective method for eliminating interaction between the signal generator and torque generator windings, non-coincidence of signal generator and torque generator nulls, and torques on the rotor due to non-symmetrical mechanical and electrical construction has been provided for. The above described invention has greatly reduced problems and has greatly increased the accuracy and sensitivity in the control apparatus described.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In apparatus of the class described: a cylindrical stator composed of magnetic material, said stator having a first and second set of poles radiating inward toward a central axis and forming a central aperture therebetween, said first set of poles being contained within a first and second quadrant of said cylindrical stator, said first and second quadrants being diametrically opposite, and said second set of poles being contained within a third and fourth quadrant of said cylindrical stator, said third and fourth quadrants being diametrically opposite; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; a variable transformer having a primary and a secondary winding; primary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said rotor, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a torque on said rotor when connected to suitable alternating voltages; balance winding means disposed about said second set of poles; means connecting said balance winding means, said secondary winding of said variable transformer, and said secondary winding means in series and adapted to have a load applied thereto; compensation winding means disposed about said second set of poles; and means connecting said compensation winding means in series with said pattern field and adapted to have an alternating voltage applied thereto.

2. In apparatus of the class described: a cylindrical stator composed of magnetic material, said stator having a first and second set of poles radiating inward toward a central axis and forming a central aperture therebetween, said first set of poles being contained within a first and second quadrant of said cylindrical stator, said first and second quadrants being diametrically opposite, and said second set of poles being contained within a third and fourth quadrant of said cylindrical stator, said third and fourth quadrants being diametrically opposite; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; primary winding means being disposed about said first set of poles and adapted to have an alternating voltage applied thereto; secondary winding means adapted to have induced therein an alternating voltage as a function of the magnitude of the voltage applied to said primary winding means and of the relative position of said stator and said rotor, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a torque on said rotor when connected to suitable alternating voltages; balance winding means disposed about said second set of poles; means connecting said balance winding means and said secondary winding means in series and adapted to have a load applied thereto; compensation winding means disposed about said second set of poles; and means connecting said compensation winding means in series with said patern field and adapted to have an alternating voltage applied thereto.

3. In apparatus of the class described: a cylindrical stator composed of magnetic material, said stator having a first and second set of poles radiating inward toward a central axis and forming a central aperture therebetween; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; a variable transformer having a primary and a secondary winding; primary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said rotor, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a torque on said rotor when connected to suitable alternating voltages; balance winding means disposed about said second set of poles; means connecting said balance winding means, said secondary winding of said variable transformer, and said secondary winding means in series and adapted to have a load applied thereto; compensation winding means disposed about said second set of poles; and means connecting said compensation winding means in series with said pattern field and adapted to have an alternating voltage applied thereto.

4. In apparatus of the class described: a cylindrical stator composed of magnetic material, said stator having a first and second set of poles radiating inward toward a central axis and forming a central aperture therebetween, said first set of poles being contained within a first and second quadrant of said cylindrical stator, said first and second quadrants being diametrically opposite, and said second set of poles being contained within a third and fourth quadrant of said cylindrical stator, said third and fourth quadrants being diametrically opposite; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; a variable transformer having a primary and a secondary winding; primary winding means being disposed about said first set of poles; means connecting said primary of said variable transformer in series with said primary winding means and adapted to have an alternatng voltage applied thereto; secondary winding means adapted to have induced therein an alternating voltage as a function of the magnitude of the voltage applied to said primary winding means and of the relative position of said stator and said rotor, said secondary winding means being disposed about said first set of poles; pattern field winding means being disposed about said second set of poles and adapted to have an alternating voltage applied thereto; control field winding means adapted to be connected to an alternating voltage, said control field winding means being disposed about said second set of poles, said pattern field winding means and said control field winding means producing a torque on said rotor when connected to suitable alternating voltages; balance winding means disposed about said second set of poles; and means connecting said balance winding means, said secondary winding of said variable transformer, and said secondary winding means in series and adapted to have a load applied thereto.

5. In apparatus of the class described: a cylindrical stator composed of magnetic material, said stator having a first and second set of poles radiating inward toward a central axis and forming a central aperture therebetween, said first set of poles being affixed to a first and a second arc of said cylindrical stator, said first and second arcs being diametrically opposite, and said second set of poles being affixed to a third and a fourth arc of said cylindrical stator, said third and fourth arcs being diametrically opposite; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; a variable transformer having a primary and a secondary winding; primary winding means being disposed about said first set of poles; means connecting said primary of said variable transformer in series with said primary winding means and adapted to have an alternating voltage applied thereto; secondary winding means adapted to have induced therein a nalternating voltage as a function of the magnitude of the voltage applied to said primary winding means and of the relative position of said stator and said rotor, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a torque on said rotor when connected to suitable alternating voltages; balance winding means disposed about said second set of poles; means connecting said balance winding means, said secondary winding of said variable transformer, and said secondary winding means in series and adapted to have a load applied thereto; compensation winding means disposed about said second set of poles; and means connecting said compensation winding means in series with said pattern field and adapted to have an alternating voltage applied thereto.

6. In apparatus of the class described: a stator, a rotor; means mounting said rotor in juxtaposition with said stator and allowing relative movement therebetween; signal generating means mounted on said stator, said signal generating means producing a signal dependent upon the relative position of said stator and said rotor; torque generating means mounted on said stator and adapted to have a signal applied thereto, said torque generating means producing a torque on said rotor when a signal is applied thereto; null compensating means; means connecting said null compensating means to said signal generating means, said null compensating means causing said signal generating means to produce a zero signal when said torque generating means is producing zero torque; and compensating means mounted on said stator, said compensating means compensating for substantially any interaction between said signal generating means and said torque generating means.

7. In apparatus of the class described: a stator, a movable member; means mounting said movable member in juxtaposition with said stator and allowing relative movement therebetween; signal generating means mounted on said stator, said signal generating means producing a signal dependent upon the relative position of said stator and said movable member; force generating means mounted on said stator and adapted to have a signal applied thereto, said force generating means producing a force on said movable member when a signal is applied thereto; null compensating means; means connecting said null compensating means to said signal generating means, said null compensating means causing said signal generating means to produce a zero signal when said force generating means is producing zero force; and compensating means mounted on said stator, said compensating means compensating for substantially any interaction between said signal generating means and said force generating means.

8. In apparatus of the class described: a cylindrical stator composed of magnetic material, said stator having a first and second set of poles radiating inward toward a central axis and forming a central aperture therebetween, said first set of poles being contained within a first and second quadrant of said cylindrical stator, said first and second quadrants being diametrically opposite, and said second set of poles being contained within a third and fourth quadrant of said cylindrical stator, said third and fourth quadrants being diametrically opposite; a cylindrical rotor composed of magnetic material, said rotor having a plurality of poles radiating outward from a central axis, the outer diameter of said cylindrical rotor and said poles affixed thereto being smaller than the inner diameter of said central aperture of said cylindrical stator; means rotatably mounting said rotor within said aperture of said stator so as to form a symmetrical air gap therebetween; a variable transformer having a primary and a secondary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said rotor, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a torque on said rotor when connected to suitable alternating voltages; compensation winding means disposed about said second set of poles; and means connecting said compensation winding means in series with said pattern field and adapted to have an alternating voltage applied thereto.

9. In apparatus of the class described: a stator, a rotor; means mounting said rotor in juxtaposition with said stator and allowing relative rotation therebetween; signal generating means mounted on said stator, said signal generating means producing a signal dependent upon the relative position of said stator and said rotor; torque generating means mounted on said stator and adapted to have a signal applied thereto, said torque generating means producing a torque on said rotor when a signal is applied thereto; null compensating means, comprising a variable transformer and winding means, said winding means being disposed about said stator; means connecting said null compensating means to said signal generating means, said null compensating means causing said signal generating means to produce a zero signal when said torque generating means is producing zero torque; and compensating means mounted on said stator, said compensating means compensating for substantially any interaction between said signal generating means and said torque generating means.

10. In apparatus of the class described: a stator, a movable member; means mounting said movable member in juxtaposition with said stator and allowing relative movement therebetween; signal generating means mounted on said stator, said signal generating means producing a signal dependent upon the relative position of said stator and said movable member; force generating means mounted on said stator and adapted to have a signal applied thereto, said force generating means producing a force on said movable member when a signal is applied thereto; null compensting means, comprising a variable transformer and winding means, said winding means being disposed about said stator; means connecting said null compensating means to said signal generating means, said null compensating means causing said signal generaing means to produce a zero signal when said force generating means is producing zero force; and compensating means mounted on said stator, said compensating means compensating for substantially any interaction between said signal generating means and said force generating means.

11. In apparatus of the class described: a stator composed of magnetic material, said stator having a first and second set of poles; a movable member composed of magnetic material, said movable member having a plurality of poles affixed thereto; means movably mounting said movable member in juxtaposition with said stator so as to form a symmetrical air gap therebetween; a variable transformer having a primary and a secondary winding; primary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said movable member, said secondary winding being disposed about first set of poles; pattern field winding means being disposed about said second set of poles; control field winding means adapted to be connected to an alternating voltage, said control field winding means being disposed about said second set of poles, said pattern field winding means and said control field winding means producing a force on said movable member when connected to suitable alternating voltages; balance winding means disposed about said second set of poles; means connecting said balance winding means, said secondary winding of said variable transformer, and said secondary winding means in series and adapted to have a load applied thereto; compensation winding means disposed about said second set of poles; and means connecting said compensation winding means in series with said pattern field and adapted to have an alternating voltage applied thereto.

12. In apparatus of the class described: a stator composed of magnetic material, said stator having a first and second set of poles; a movable member composed of magnetic material, said movable member having a plurality of poles affixed thereto; means movably mounting said movable member in juxtaposition with said stator so as to form a symmetrical air gap therebetween; a variable transformer having a primary and secondary winding; primary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said movable member, said secondary winding means being disposed about said first set of poles; pattern field winding means being disposed about said second set of poles; control field winding means adapted to be connected to an alternating voltage, said control fiield winding means being disposed about said second set of poles, said pattern field winding means and said control field winding means producing a force on said movable member when connected to suitable alternating votages; compensation winding means disposed about said second set of poles; and means connecting said compensation winding means in series with said pattern field and adapted to have an alternating voltage applied thereto.

13. In apparatus of the class described: a stator composed of magnetic material, said stator having a first and second set of poles; a movable member composed of magnetic material, said movable member having a plurality of poles affixed thereto; means movably mounting said movable member in juxtaposition with said stator so as to form a symmetrical air gap therebetween; primary winding means being disposed about said first set of poles and adapted to have an alternating voltage applied thereto; secondary winding means adapted to have induced therein an alternating voltage as a function of the magnitude of the voltage applied to said primary winding means and of the relative position of said stator and said movable member, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a force on said movable member when connected to suitable alternating voltages; balance winding means disposed about said second set of poles; means connecting said balance winding means and said secondary winding means in series and adapted to have a load applied thereto; compensation winding means disposed about said second set of poles; and means connecting said compensation winding means in series with said pattern field and adapted to have an alternating voltage applied thereto.

14. In apparatus of the class described: a stator composed of magnetic material, said stator having a first and second set of poles; a movable member composed of magnetic material, said movable member having a plurality of poles affixed thereto; means movably mounting said movable member in juxtaposition with said stator so as to form a symmetrical air gap therebetween; a variable transformer having a primary and a secondary winding; primary winding means being disposed about said first set of poles; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said movable member, said secondary winding means being disposed about said first set of poles; pattern field winding means being disposed about said second set of poles; control field winding means adapted to be connected to an alternating voltage, said control field winding means being disposed about said second set of poles, said pattern field winding means and said control field winding means producing a force on said movable member when connected to suitable alternating voltages; balance winding means disposed about said second set of poles; and means connecting said balance winding means, said secondary winding of said variable transformer, and said secondary winding means in series and adapted to have a load applied thereto.

15. In apparatus of the class described: a stator composed of magnetic material, said stator having a plurality of poles affixed thereto; a movable member composed of magnetic material, said movable member having a plurality of poles affixed thereto; means movably mounting said movable member in juxtaposition with said stator so as to form a symmetrical air gap therebetween; a variable transformer having a primary and a secondary winding; primary winding means being disposed about said poles affixed to said stator; means connecting said primary of said variable transformer in series with said primary winding means and adapted to have an alternating voltage applied thereto; secondary winding means adapted to have induced therein an alternating voltage as a function of the magnitude of the voltage applied to said primary winding means and of the relative position of said stator and said movable member, said secondary winding means being disposed about said poles affixed to said stator; pattern field winding means being disposed about said poles affixed to said stator; control field winding means adapted to be connected to an alternating voltage, said control field winding means being disposed about said poles affixed to said stator, said pattern field winding means and said control field winding means producing a force on said movable member when connected to suitable alternating voltages; balance winding means disposed about said poles affixed to said stator; means connecting said balance winding means, said secondary winding of said variable transformer, and said secondary winding means in series and adapted to have a load applied thereto; compensation winding means disposed about said poles of said stator; and means connecting said compensation winding means in series with said pattern field and adapted to have an alternating voltage applied thereto.

References Cited by the Examiner
UNITED STATES PATENTS

| | | | |
|---|---|---|---|
| 2,519,422 | 8/50 | Agins | 74—5.4 X |
| 2,669,126 | 2/54 | Simmons | 74—5.6 |
| 2,908,168 | 10/59 | Maynard | 74—5.6 |

MILTON O. HIRSHFIELD, *Primary Examiner.*
DAVID X. SLINEY, *Examiner.*